Nov. 18, 1952  J. TANNENBERG  2,618,158
DEVICE FOR VOLUME DETERMINATION OF EXTREMELY SMALL
QUANTITIES OF FLUIDS FOR SCIENTIFIC ANALYTIC TESTS
Filed Nov. 17, 1949
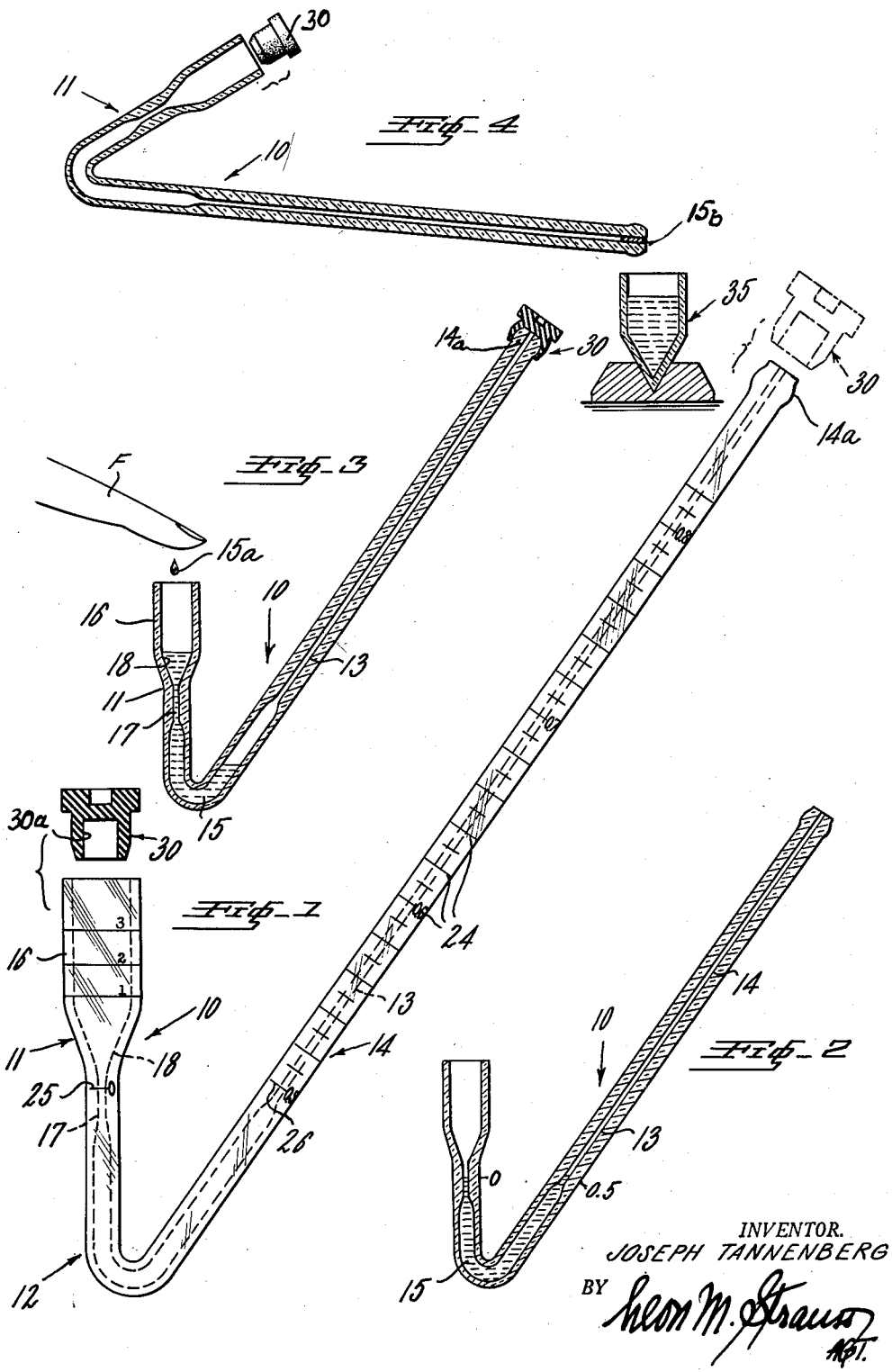
INVENTOR.
JOSEPH TANNENBERG
BY Patented Nov. 18, 1952

2,618,158

UNITED STATES PATENT OFFICE 2,618,158

DEVICE FOR VOLUME DETERMINATION OF EXTREMELY SMALL QUANTITIES OF FLUIDS FOR SCIENTIFIC ANALYTIC TESTS

Joseph Tannenberg, Batavia, N. Y.

Application November 17, 1949, Serial No. 127,844

4 Claims. (Cl. 73—427)

This invention refers to measuring devices and is concerned more particularly with a measuring device for quick and accurate determination of the total volume of fluids which are only available in small quantities, say, as single or several small drops of certain biological fluids for instance. The device is suitable for the purpose of determination of the volume alone, or this determination may be made preparatory to carrying out a number of hematological, serological, chemical, biological or other scientific tests, either qualitatively or quantitatively. It may also be used for quick and accurate determination of the volume of small solid particles which are soluble in a suitable diluent.

It is the main object of the present invention to provide means affording accurate and quick determination of the volume of small amounts of fluid (in particular of liquid) with recovery and full preservation of the fluid for subsequent qualitative or quantitative scientific tests. The invention further contemplates easy determination of the total volume of a single (free falling) drop of any type of fluid, as well as of the volume of a number of successively falling drops which may follow each other in fairly quick sequence. This determination of the volume of single free falling drops by itself may be used as a means for ascertaining certain qualities of fluid to be examined.

It is a further object of this invention to provide means ensuring accurate and quick determination of a small quantity or quantities of fluids, in particular biological fluids, before changes thereof occur, for example, by clotting, evaporation, escape of gases, and the like.

It is another object of the present invention to provide means facilitating accurate determination of the volume of even a single drop, particularly of a biological fluid, in a simple and quick manner whereby said fluid may also be simultaneously prepared for subsequent chemical, hematological, serological, biological or other scientific test or tests for industrial purposes.

Yet another object of the present invention is to provide means rendering possible within the measuring device the preservation of the fluid to be tested for a certain length of time and for shipping purposes.

Still another object of the invention is to provide means contributing to a speedy and thorough mixture of two or more fluid substances within the measuring device.

A still further object of the invention is to provide means producing a differential flow between marginal and median or central streams of fluid or fluids within the tubular measuring device to thereby obtain intimate mixture of the fluids employed.

These and other objects of the invention will be pointed out in the following description and claims and illustrated in the accompanying drawing which discloses, by way of example, the principle of the invention and the preferred mode which has been contemplated for applying said principle.

In the drawing:

Fig. 1 is a side elevational view of the measuring device according to the invention, and shown with the cup in upright position and the stopper or cap removed therefrom.

Fig. 2 is a sectional view on reduced scale of the device shown in Fig. 1 and filled with a diluent or similar fluid.

Fig. 3 is a view similar to that of Fig. 2 with a cap applied to the end of the pipette portion and showing a free falling drop of blood from a pricked finger.

Fig. 4 shows the device of Fig. 2 in the position of being emptied.

Referring now more particularly to the drawing, there is shown a substantially V-shaped measuring device 10 consisting of a relatively short tubular portion 11, a bend portion 12, and a relatively long tubular pipette portion 14, a suitable fluid or liquid 15 partly filling the bore 13 of the device.

At the end of the short tubular arm or portion 11 is provided a cup 16. The diameter of bore 17 of tube portion 11 corresponds approximately to the diameter of bore 13 of pipette 14. The transition from cup 16 to portion 11 is effectuated by a steep slanting wall 18 at the lower end of cup 16 so that any fluid received in cup 16 may completely flow by gravity into bore 17 of portion 11, as will be later explained. Cup 16 has an inner diameter of approximately 10 to 12 mm., its volume capacity is about 3 to 6 ml. and it can be provided with graduation marks indicating milliliters or fractions thereof. The inner lower wall end of cup 16 is shaped so as to avoid substantially any deposit of liquid thereon due to adhesion, surface tension or otherwise.

As indicated in the drawing, portion 11 is provided with a marking 25 indicating "zero." Pipette portion 14 has graduation marks 24 preferably of the type indicating 0.01 or 0.005 ml. The bend portion of the device need not have any graduation marks at all, reference mark 26 on the lower part of portion 14 starting, say, with 0.5 indicating that the total volume of the bend portion 12 extending between the "zero" marking 25 and the starting mark 26 is 0.5 milliliter (ml.). Upwards from reference mark 26 on portion 14 each 0.1 milliliter is marked by a respective number, such as 0.6, 0.7, etc., the markings therebetween indicating 1/100 ml.

Cup 16 is suitably shaped at its upper end to receive a rubber cap or stopper 30 for closing the upper end of cup 16 to ensure tightness of closure. A similar means of closure is contemplated for the upper end 14a of portion 14.

The bores of the cup 16, of tubular portion 11, of bend portion 12 and pipette portion 14 differ as to their inner diameters along the various sections of the device. The pipette portion 14 forms an angle with respect to the short tube 11 of about 30 to 40 degrees. A U-like bend 12 would also be workable but the V-like bend is preferred since it facilitates complete discharge of the device.

Cup 16 has a steep slanted lower portion which will ensure complete and ready flow of fluid from the cup into the pipette if the short tubular portion of the measuring device is held vertical.

The bore of portion or segment 12 is about 3 mm. in diameter. This segment 12 may be provided with one or two bulb-like dilatations; however, this variation is not essential and mixture of fluids introduced into the device occurs even better when the walls of this segment are cylindrical. The bent segment 12 with relatively wide inner bore need not be graduated; its capacity may vary from 0.2 to 1.0 ml.

*Principle of determination of the volume of small amounts of fluid*

Practically all or almost all qualitative or quantitative scientific tests of biological fluids or the like are done following dilution of the original fluid material obtained. A number of different solutions may be used as diluents according to the various tests, objectives or purposes. Distilled water, oxalated water, saline, diluted hydrochloric or sulfuric or acetic acid and other suitable solutions may be used for certain purposes. If it is known to which tests the biological fluid 15a in question is to be subjected, an adequate solution or diluent 15 is selected as diluent.

In order to accurately measure a given fluid that will be available in small amounts only, say, for instance one or several drops of blood 15a on which subsequently a determination of the blood sugar should be made, the following steps are carried out:

(1) Oxalated water is selected as an adequate diluent for this purpose. About 0.5 ml. (or cc.) are introduced into the cup 16 of the device which is held in vertical position. The introduced diluent will, by its gravity, flow down filling the deepest portion 12 of the device and then rising in both tube portions 11 and 14. By simply inclining the device towards tubular portion 14, the fluid is forced by gravity to flow into the longer portion 14 until its level in the shorter portion 11 is below the reference mark 0. Now the upper, open end 14a of the longer arm or pipette portion 14 is closed by a stopper or a finger, the cup and short arm 11 are then again brought into vertical position and by cautiously releasing the pressure of the stopper or finger from the upper end 14a of pipette 14, the fluid is allowed to rise slowly within the bore 17 of the portion 11 until it reaches the reference mark 25.

As soon as the meniscus of the fluid reaches the level of the "zero" marking at 25, the fluid level is caused to remain stationary and the level of the fluid is also read on the pipette 14. If the amount of fluid introduced into the device was exactly 0.5 ml., this volume will be indicated exactly by reaching the 0.5 marking on portion 14 of the device. If it is less than 0.5 ml., the level will be indicated below the 0.5 marking and it is recommended to fill up the device with diluent until level marking 0.5 is reached. In any event, the volume of fluid introduced into the device may be accurately determined to a degree of 1/200 (0.005) of one ml. (cc).

(2) Following the accurate determination of the volume of diluent present within the device, the pressure of the finger on the upper end 14a of the pipette arm 14 is completely released and the device is inclined toward the short tubular portion 11 so that the fluid within the device will flow by gravity into the lower portion of cup 16. After this is accomplished, the upper end of pipette portion 14 is closed again, either by a finger or by the tightly fitting rubber stopper or cap 30. Thus, the fluid is caused (by the pressure of air below cap 30) to remain within the lower part of cup 16 when the device is now brought back to its upright position. Thereupon a drop or several drops of blood 15a are allowed to fall freely into the open end of cup 16 and immediately mix with the diluting fluid 15 present there. This mixture of blood and diluent is then immediately drawn into the bend or knee part 12 of the device by removing the finger or the rubber cap from the upper end 14a of portion 14 and the same procedure as outlined above for measuring the volume of the diluting fluid is followed again.

By inclining the device toward the pipette portion 14, all fluid is forced to run into the latter until the mixed fluid recedes to a level below the "zero" marking 25 of the short tubular portion 11. The upper open end 14a of pipette 14 is first closed by the finger of a hand which by then gradually releasing the pressure of air column within portion 14 permits the mixture fluid to rise to and assume the level of the "zero" marking 25 in short portion 11. The level of the mixed fluid (diluent and blood) is then read on the graduations of the pipette 14 so that the total volume of the blood and diluent can thus be determined. The difference of the reading of the diluent within the pipette 14 prior to and following the adding of the drop or drops of blood 15a indicates the volume of blood added with an accuracy of 0.005 ml. (cc.).

Fig. 2 illustrates the measuring device 10 filled with a diluent reaching from the "zero" marking to a 0.5 marking in pipette 14.

Fig. 3 illustrates how the diluent is forced into the cup 16 by means of cap or stopper 30 and how a drop of blood 15 falls into cup 16 from a finger F.

(3) Following the determination of the volume of the blood added to the diluent fluid and now present within the measuring device, a thorough mixture of the blood and oxalated water (diluent used in this case) is brought about by repeatedly and alternately inclining the measuring device 10 toward the long and short tubular portions 14 and 11. Since the total volume of the mixture has been determinined by the reading last referred to, it can easily be calculated how much blood is contained within 0.1 ml. (cc.) of the mixture.

The adequately diluted blood can now easily be removed in desired quantities from the cup 16 by any conventional calibrated pipette or transferred to a flask 35 or other apparatus adequate for the further tests to be performed (Fig. 4).

If it should be desired to use the entire amount of diluted blood within the device the entire fluid can be removed from the open upper end of the pipette by tilting the device as indicated in Fig. 4. This emptying operation will, however, not prevent that a small amount or part 15b of the mixture fluid still remains in the end of the capillary bore of the pipette. This remainder of fluid is easily removed by inserting stopper 30 into the open end of the cup (Fig. 4) to displace the air column therein while at the same time the end of the long pipette is placed over the flask 35 for receiving the rest of such expelled mixture fluid.

If it should be desired to determine, for instance, simultaneously hemoglobin content, red and white cell counts and plasma protein as well as the type of blood cells (A, B, O, AB and Rh) in the same single drop of blood, the diluent used should be saline or a fluid of an osmotic pressure equal to that of blood.

The measuring procedure would be the same as described above. Following determination by calculation of how much blood is contained within 0.1 ml. (cc.) of the total mixture obtained, a small drop of the mixture eventually following further dilution with appropriate diluent or diluents is transferred to a conventional cell counting chamber.

In addition, it would also be possible to determine with the same sample of blood-saline mixture, the hemoglobin content by transferring a measured amount of the mixture to a tube containing dilute hydrochloric acid and obtaining the results upon proper reading and calculation by means of a photo-electrocolorimeter. If desired, the same diluted blood mixture could also be used to determine the percentage of cells of the total blood volume, and the same mixture could be used to determine the blood type including "Rh" type. It is of considerable medical interest to have a device to do all these tests on one or several drops of blood obtainable by pricking the finger, ear lobe or toe, particularly of babies, children or adult persons who not infrequently present considerable difficulties for the withdrawal of larger quantities of blood from a vein.

If blood or other fluids containing much protein are mixed by shaking or blowing air into them, with watery fluids, there are eventually air bubbles or foam produced which would make it difficult to draw the whole mixture into the measuring device from the cup. This difficulty can easily be overcome by adding one drop of caprylic alcohol to the diluent prior to the admixture of blood. It is a well known property of caprylic alcohol to prevent foam formation under such conditions.

If it is desired to determine blood volume without having the blood coming in contact with air, such as required in the determination of oxygen content or other blood cases, it would be necessary to employ the following steps:

First, place a few drops of oil or petrolatum into the empty cup 16, then introduce from 0.5 or 1.0 milliliter (cc.) of the desired aqueous diluent into said cup, and finally cover said diluent with petrolatum, determining the volume of the aqueous diluent between the aforesaid two petrolatum or oil layers or deposits within the pipette in a manner hereinabove described. Thereafter the diluent is to be adjusted as to its level so as to fill the lower part of the cup while the upper end of the inclined pipette arm 14 is closed by a finger of a hand. The blood to be tested may be obtained by puncturing a finger of a patient. The bleeding finger is then immersed into the layer of oil (petrolatum) which covers the surface of the diluent within the cup, which layer may have a thickness of several mm. The blood comes directly in contact with the oil layer and then falls through said oil layer into the aqueous diluent without getting in contact with air.

In case any particles, the volume of which is to be determined, are soluble within the diluent fluid and the concentration of the solution made by their solution is to be determined, the procedure is about the same as outlined above. The volume of the diluent introduced into the device is first determined as described above. Then part of the fluid is forced back into the lower part of cup 16 and the solid particles are placed in this fluid, dissolved and the total volume thereupon is again determined.

It can thus be seen that the measuring device made in accordance with this invention is useful for many purposes. It is preferred to produce the measuring device from glass, plastic composition or similar transparent material.

Due to the fact that the measuring device has bores of various inner diameters a brake of the fluid mixture when tilting the device toward and away from the long pipette portion occurs so that the fluid flow is partly retarded and partly increased within the bores to thereby achieve better and faster mixture of the diluent with the blood drop or other substance to be tested.

It is further to be noted that a differential flow between the marginal and central streams of the fluid occurs lengthwise of the bores within the measuring device so that the mixture of the fluids becomes intimate and more uniform.

It is to be observed that stopper 30 has an outer diameter which fits into the inner diameter of cup 16, whereas, the inner bore 30a of the stopper is of such diameter that the stopper may be placed over the upper end 14a of the pipette, as illustrated in Fig. 3.

It can thus be seen that there has been provided in accordance with this invention a transparent measuring device which comprises a substantially V-shaped tubular bend, a relatively short tube portion extending from one end of said bend, a relatively long tube portion extending from the other end of said bend, said short tube portion terminating in a cup, the inner diameter of said tubular bend being substantially larger than the inner diameter of each of said tube portions, and markings on said tube portions, respectively.

Although the invention has been described with reference to certain specific embodiments thereof, it is to be distinctly understood that various modifications and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent, is:

1. A transparent measuring device comprising a substantially V-shaped tube, a relatively short tube portion connected to one end of said V-shaped tube, a relatively long tube portion connected to the other end of said V-shaped tube, said short tube portion terminating in a cup, the inner diameter of said V-shaped tube being substantially larger than the inner diameter of each of said tube portions, and markings on said tube portions, respectively.

2. A transparent measuring device according to claim 1, wherein said long tube portion is in the form of a pipette, the inner diameter of said long tube portion and that of said short tube portion being substantially the same.

3. A transparent measuring device for a liquid substance comprising an angular-shaped tube whose inner diameter is calculated so as to accommodate within said tube a predetermined volume of a diluent, said tube having opposite ends, a relatively short tube portion connected to one end of said tube, a relatively long tube portion connected to the other end of said tube, said short tube portion terminating in a cup for receiving said liquid, the inner diameter of said angular-shaped tube being substantially larger than the inner diameter of each of said tube portions, and respective markings on said tube portions.

4. A measuring device for a liquid substance comprising a substantially angular-shaped tubular body, a relatively short tube portion connected to one end of said body, a relatively long tube portion connected to the other end of said body, said short tube portion terminating in a cup-shaped enlargement, the inner diameter of said tubular body being substantially larger than the inner diameter of each of said tube portions, said long tube portion being provided with a measuring scale, said short tube portion being provided with a marking, whereby the extent from said marking to said scale on said long tube portion indicates the volume of liquid contained within said angular-shaped tubular body.

JOSEPH TANNENBERG.

REFERENCES CITED

The following references are of record in the file of this patent:

UNITED STATES PATENTS

| Number | Name | Date |
|---|---|---|
| 804,894 | Soderlund | Nov. 21, 1905 |
| 1,046,259 | Bunzel | Dec. 3, 1912 |
| 1,433,075 | Gottlieb | Oct. 24, 1922 |